United States Patent
Wloczysiak et al.

(10) Patent No.: US 10,666,300 B2
(45) Date of Patent: May 26, 2020

(54) SWITCHABLE IMPEDANCE PHASE SHIFTER FOR SWITCHED MULTIPLEXING APPLICATIONS

(71) Applicant: SKYWORKS SOLUTIONS, INC., Woburn, MA (US)

(72) Inventors: Stephane Richard Marie Wloczysiak, Irvine, CA (US); Phi Nguyen Dang, Irvine, CA (US)

(73) Assignee: SKYWORKS SOLUTIONS, INC., Woburn, MA (US)

( * ) Notice: Subject to any disclaimer, the term of this patent is extended or adjusted under 35 U.S.C. 154(b) by 129 days.

(21) Appl. No.: 15/693,035

(22) Filed: Aug. 31, 2017

(65) Prior Publication Data

US 2018/0076834 A1 Mar. 15, 2018

Related U.S. Application Data

(60) Provisional application No. 62/385,739, filed on Sep. 9, 2016.

(51) Int. Cl.

| H04B 1/00 | (2006.01) |
|---|---|
| H04B 1/12 | (2006.01) |
| H04B 1/7075 | (2011.01) |
| H04M 11/06 | (2006.01) |
| H04L 5/02 | (2006.01) |
| H04L 5/00 | (2006.01) |
| H04B 1/48 | (2006.01) |

(52) U.S. Cl.
CPC ............. *H04B 1/001* (2013.01); *H04B 1/005* (2013.01); *H04B 1/0017* (2013.01); *H04B 1/0057* (2013.01); *H04B 1/126* (2013.01); *H04B 1/48* (2013.01); *H04B 1/7075* (2013.01); *H04L 5/001* (2013.01); *H04L 5/0098* (2013.01); *H04L 5/026* (2013.01); *H04M 11/062* (2013.01)

(58) Field of Classification Search
CPC ........................ H04B 1/0017; H03F 2200/451
See application file for complete search history.

(56) References Cited

U.S. PATENT DOCUMENTS

2016/0181986 A1* 6/2016 Perreault ............... H03F 3/2176
                                                              330/251
2017/0244432 A1* 8/2017 Ranta ................... H04B 1/0067

* cited by examiner

*Primary Examiner* — Shukri Taha
(74) *Attorney, Agent, or Firm* — Chang & Hale LLP

(57) ABSTRACT

Described herein are systems configured for inter-band carrier aggregation. Systems include a multiplexing circuit having a switching network and diplexers wherein the switching network is configured to share inductors between multiple paths of the multiplexing circuit. The filters can be designed so that when operated simultaneously (e.g., during multi-band operation) the same inductance can be used allowing the switching network to switch in a particular inductance into the path. The described systems can include an inductance that is coupled to an output port so that when operating in single-band mode, the different paths share the same inductance. Relative to other solutions, the described systems can improve performance (e.g., reduce insertion loss), reduce the number of components in the associated module, reduce manufacturing costs, and the like.

20 Claims, 12 Drawing Sheets

SWITCHABLE IMPEDANCE PHASE SHIFTER FOR SWITCHED MULTIPLEXING APPLICATIONS

CROSS-REFERENCE TO RELATED APPLICATIONS

This application claims priority to U.S. Provisional Application No. 62/385,739 filed Sep. 9, 2016 and entitled "SWITCHABLE IMPEDANCE PHASE SHIFTER FOR SWITCHED DIPLEXING APPLICATIONS," which is expressly incorporated by reference herein in its entirety for all purposes.

BACKGROUND

Field

The present disclosure generally relates to front-end modules for wireless communication applications.

Description of Related Art

Wireless communication devices typically include components in a front-end module that are configured to filter and/or amplify received radio-frequency (RF) signals. It may be beneficial to provide impedance matching for the signals in the front-end module. The front-end module can be configured to include components configured to provide impedance matching for signals being processed.

SUMMARY

According to a number of implementations, the present disclosure relates to a multiplexing system that includes a plurality of filters each associated with a frequency band. The multiplexing system also includes a switching assembly configured to provide one or more simultaneous signal paths between a signal port and one or more respective filters. The multiplexing system also includes a first inductance associated with the signal port of the switching assembly. The multiplexing system also includes a second inductance coupled to an added throw of the switching assembly, the added throw configured to be selectively connected to the signal port to provide a targeted phase for each of the one or more simultaneous signal paths.

In some embodiments, the multiplexing system also includes a controller circuit configured to control the switching assembly to provide selected signal paths between the signal port and one or more respective filters. In further embodiments, the controller circuit is further configured to control the switching assembly to selectively couple the second inductance to the signal port.

In some embodiments, in a single-band mode, the added throw is open so that the second inductance is not connected to the signal port. In further embodiments, in a multi-band mode, the added throw is closed so that the second inductance is connected to the signal port.

In some embodiments, the second inductance is a variable inductance. In further embodiments, the second inductance is configured to provide different inductance values based at least in part on the one or more simultaneous signal paths.

In some embodiments, the multiplexing system also includes a plurality of additional inductances coupled to a plurality of additional throws of the switching assembly, the plurality of additional throws configured to be selectively connected to the signal port to provide a targeted phase for each of the one or more simultaneous signal paths. In some embodiments, individual paths between individual filters of the plurality of filters and the switching assembly do not include shunt inductors. In some embodiments, individual paths between individual diplexers of the plurality of filters and the switching assembly do not include shunt inductors.

According to a number of implementations, the present disclosure relates to a front end architecture that includes a multiplexer including a plurality of filters each associated with a frequency band, a switching assembly configured to provide one or more simultaneous signal paths between a signal port and one or more respective filters, a first inductance associated with the signal port of the switching assembly, and a second inductance coupled to an added throw of the switching assembly, the added throw configured to be selectively connected to the signal port to provide a targeted phase for each of the one or more simultaneous signal paths. The architecture also includes a controller implemented to control the switching assembly to provide respective signal paths between the signal port and any permutation of one or more of the plurality of filters and to selectively couple the second inductance to the signal port.

In some embodiments, the second inductance is a variable inductor that is controlled by the controller to provide a tailored inductance value. In some embodiments, the first inductance or the second inductance is implemented as a surface mount technology device.

In some embodiments, the architecture also includes additional inductances coupled to additional throws of the switching assembly. In further embodiments, the controller is further configured to selectively couple the signal port to the second inductance, to an individual inductance of the additional inductances, to a combination of the additional inductances, or to any combination of the second inductance and an additional inductance.

According to a number of implementations, the present disclosure relates to a wireless device that includes an antenna port coupled to an antenna. The wireless device also includes a multiplexer coupled to the antenna port, the multiplexer including a plurality of filters each associated with a frequency band, a switching assembly configured to provide one or more simultaneous signal paths between a signal port coupled to the antenna port and one or more respective filters, a first inductance associated with the signal port of the switching assembly, and a second inductance coupled to an added throw of the switching assembly, the added throw configured to be selectively connected to the signal port to provide a targeted phase for each of the one or more simultaneous signal paths. The wireless device also includes a controller implemented to control the switching assembly to provide respective signal paths between the signal port and any permutation of one or more of the plurality of filters and to selectively couple the second inductance to the signal port.

In some embodiments, the device also includes additional inductances coupled to additional throws of the switching assembly.

According to a number of implementations, the present disclosure relates to a diversity receiver module that includes a packaging substrate configured to receive a plurality of components. The module also includes a multiplexer mounted on the packaging substrate, the multiplexer including a plurality of filters each associated with a frequency band, a switching assembly configured to provide one or more simultaneous signal paths between a signal port and one or more respective filters, a first inductance associated with the signal port of the switching assembly, and a second inductance coupled to an added throw of the switching assembly, the added throw configured to be selectively connected to the signal port to provide a targeted phase for each of the one or more simultaneous signal paths. The module also includes a controller mounted on the packaging substrate, the controller implemented to control the switching assembly to provide respective signal paths between the signal port and any permutation of one or more of the plurality of filters and to selectively couple the second inductance to the signal port.

In some embodiments, in a single-band mode, the added throw is open so that the second inductance is not connected to the signal port and in a multi-band mode the added throw is closed so that the second inductance is connected to the signal port.

According to a number of implementations, the present disclosure relates to a wireless device that includes a primary antenna and a diversity antenna spaced apart from the primary antenna, the diversity antenna configured to receive wireless signals corresponding to a plurality of radio access networks. The wireless device also includes a diversity receiver module in communication with the diversity antenna, the diversity receiver module including a packaging substrate configured to receive a plurality of components, the diversity receiver module further including a multiplexer implemented on the packaging substrate, the multiplexer including a plurality of filters each associated with a frequency band, a switching assembly configured to provide one or more simultaneous signal paths between a signal port coupled to the diversity antenna and one or more respective filters, a first inductance associated with the signal port of the switching assembly, and a second inductance coupled to an added throw of the switching assembly, the added throw configured to be selectively connected to the signal port to provide a targeted phase for each of the one or more simultaneous signal paths. The wireless device also includes a controller implemented to control the switching assembly to provide respective signal paths between the signal port and any permutation of one or more of the plurality of filters and to selectively couple the second inductance to the signal port.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
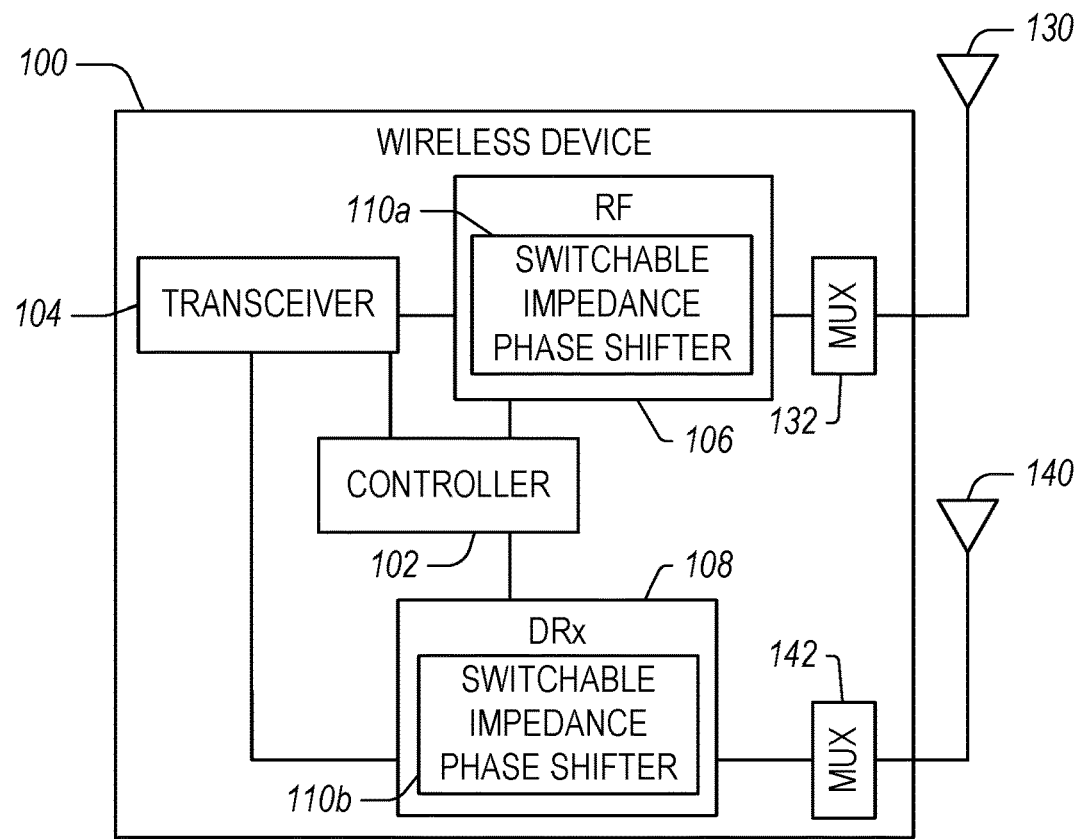
FIG. 1 illustrates a wireless device having a primary antenna and a diversity antenna.

The headings provided herein, if any, are for convenience only and do not necessarily affect the scope or meaning of the claimed invention.

Overview

In cellular systems that support carrier aggregation, the receiver front end processes one or more signals at the same time. In inter-band carrier aggregation, the cellular system separates signals from at least two distinct carrier frequencies. In typical cellular systems, such multi-band processing is accomplished by permanently multiplexing two or more resonant filter circuits. In such systems, however, carrier aggregation may be made more difficult due at least in part to the loss generated by the multiplexing circuit. Furthermore, in such cellular systems band combinations are not allowed where frequency ranges overlap. If these band combinations are needed, these cellular systems generally duplicate filters. To address these shortcomings, some cellular systems employ an architecture that uses switching networks and diplexers to control the paths that are activated, improving single band operation compared to the permanent multiplexer architecture while providing comparable multi-band performance. However, this architecture generally adds many components, such as inductors, that cannot be integrated on the same die due at least in part to the targeted or required quality factor (Q) needed to achieve acceptable losses associated with multiplexing. To fit these inductors within a small envelope, some systems may reduce the physical size of the inductors which consequently negatively impacts the quality factor (Q) of the system.

Accordingly, provided herein are systems configured for inter-band carrier aggregation that includes a multiplexing circuit having a switching network and diplexers wherein the switching network is configured to share inductors between multiple paths of the multiplexing circuit. In certain implementations, the filters can be designed so that when operated simultaneously (e.g., during multi-band operation) the same inductance can be used allowing the switching network to switch in a particular inductance into the path. In various implementations, a variable inductance or a plurality of inductors can be switched into the path to provide a variety of inductance values for the filters being switched into and out of the path. In such implementations, various paths can share a matching inductor that is used in single band operation and share an additional, switchable matching inductor that is used in multi-band operation. The described systems can include an inductance that is coupled to an output port so that when operating in single-band mode, the different paths share the same inductance. Relative to other solutions, the described systems can improve performance (e.g., reduce insertion loss), reduce the number of components in the associated module, reduce manufacturing costs, and the like. The savings in size may be used to populate the module with higher quality factor inductors (e.g., having a larger physical size) resulting in higher performance.

For example, described herein are multiplexing systems that can include a plurality of filters each associated with a frequency band. The multiplexing systems can include a switching assembly configured to provide one or more simultaneous signal paths between a signal port and one or more respective filters. The multiplexing systems can include a first inductance associated with the signal port of the switching assembly. The multiplexing systems can include a second inductance coupled to an added throw of the switch assembly, the added throw capable of being selectively connected to the signal port to provide a desired or targeted phase for each of the one or more simultaneous signal paths.

FIG. 1 shows a wireless device 100 having a primary antenna 130 and a diversity antenna 140. The wireless device includes an RF module 106 and a transceiver 104 that may be controlled by a controller 102. The transceiver 104 is configured to convert between analog signals (e.g., radio-frequency (RF) signals) and digital data signals. To that end, the transceiver 104 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components.

The RF module 106 is coupled between the primary antenna 130 and the transceiver 104. Because the RF module 106 may be physically close to the primary antenna 130 to reduce attenuation due to cable loss, the RF module 106 may be referred to as a front-end module (FEM). The RF module 106 may perform processing on an analog signal received from the primary antenna 130 for the transceiver 104 or received from transceiver 104 for transmission via the primary antenna 130. To that end, the RF module 106 may include filters, power amplifiers, band select switches, matching circuits, and other components.

When a signal is transmitted to the wireless device, the signal may be received at both the primary antenna 130 and the diversity antenna 140. The primary antenna 130 and diversity antenna 140 may be physically spaced apart such that the signal at the primary antenna 130 and diversity antenna 140 is received with different characteristics. For example, in one embodiment, the primary antenna 130 and diversity antenna 140 may receive the signal with different attenuation, noise, frequency response, or phase shift. The transceiver 104 may use both of the signals with different characteristics to determine data bits corresponding to the signal. In some implementations, the transceiver 104 selects from between the primary antenna 130 and the diversity antenna 140 based on the characteristics, such as selecting the antenna with the highest signal-to-noise ratio. In some implementations, the transceiver 104 combines the signals from the primary antenna 130 and the diversity antenna 140 to increase the signal-to-noise ratio of the combined signal.

In some implementations, the transceiver 104 processes the signals to perform multiple-input/multiple-output (MiMo) communication.

In some embodiments, the primary antenna 130 and/or the diversity antenna 140 is configured to receive signals within cellular frequency bands that fall within, for example, low-band (LB) cellular, mid-band (MB) cellular, high-band (HB) cellular, and/or ultrahigh-band (UHB) cellular. In such embodiments, the wireless device 100 can include multiplexers 132, 142 coupled to the respective antennas 130, 140, the multiplexers being configured to separate the received signal into different frequency ranges. For example, the multiplexer 132, 142 can be configured to include a low pass filter that passes a frequency range that includes low band (LB) cellular frequencies, a bandpass filter that passes a frequency range that includes mid-band and high-band (MB-HB) cellular signals, and a high pass filter that passes a frequency range that includes ultrahigh-band (UHB) cellular signals. This example is merely for illustrative purpose. As another example, the multiplexers 132, 142 can have a variety of different configurations such as a diplexer that provides the functionality of a high pass filter and a low pass filter.

Because the diversity antenna 140 is physically spaced apart from the primary antenna 130, the diversity antenna 140 is coupled to the transceiver 104 by a transmission line, such as a cable or a printed circuit board (PCB) trace. In some implementations, the transmission line is lossy and attenuates the signal received at the diversity antenna 140 before it reaches the transceiver 104. Thus, in some implementations, gain is applied to the signal received at the diversity antenna 140. The gain (and other analog processing, such as filtering) may be applied by a diversity receiver (DRx) module 108. Because the diversity receiver module 108 is located physically close to the diversity antenna 140, it may be referred to a diversity receiver front-end module, examples of which are described in greater detail herein.

The RF module 106 and the DRx module 108 include respective switchable impedance phase shifter circuits 110a, 110b. The switchable impedance phase shifter circuits 110a, 110b are configured to provide targeted impedances for particular frequency bands, particular frequency band combinations, single band operation, and multi-band operation. As described in greater detail herein, the switchable impedance phase shifter circuits 110a, 110b include switching networks configured to selectively couple inductive elements into a signal path to provide a targeted phase shift or impedance. The switchable impedance phase shifter circuits 110a, 110b can be configured to selectively provide a targeted phase shift and/or impedance depending at least in part on a mode of operation of the wireless device (e.g., single-band operation or multi-band operation). These circuits 110a, 110b may be particularly advantageous where the wireless device is configured to operate in a single band mode (e.g., in a non-carrier aggregation mode) and in a multi-band mode (e.g., in a carrier aggregation mode).

Figure 2:
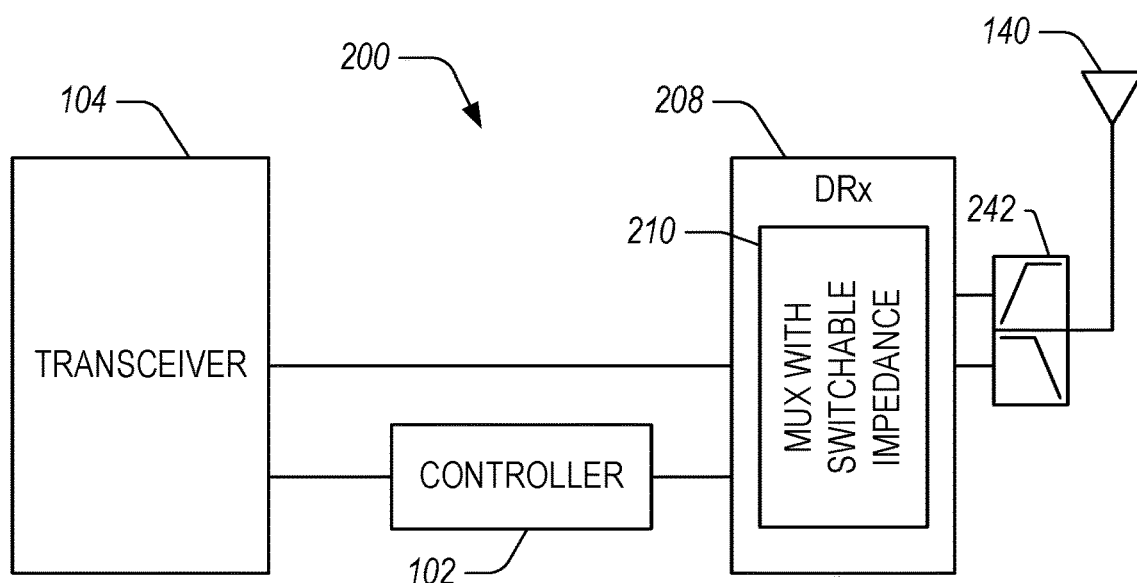
FIG. 2 illustrates a diversity receiver (DRx) configuration including a DRx front-end module (FEM).

FIG. 2 shows a diversity receiver (DRx) configuration 200 including a DRx front-end module (FEM) 208. The DRx configuration 200 includes a diversity antenna 140 that is configured to receive a diversity signal and to provide the diversity signal to the DRx FEM 208 through a diplexer 242. The diplexer 242 can be configured to pass first signals having a frequency above a first threshold along a first path to the DRx FEM 208 and to pass second signals having a frequency below a second threshold along a second path to the DRx FEM 208. In some embodiments, the first threshold is greater than or equal to the second threshold. As an example, the first signals can include mid- and/or high-band cellular frequencies and the second signals can include low-band cellular frequencies.

The DRx FEM 208 is configured to perform processing on the diversity signals received from the diplexer 242. For example, the DRx FEM 208 may be configured to filter the diversity signals to one or more active frequency bands. The controller 120 can be configured to control the DRx FEM 208 to selectively direct signals to targeted filters to accomplish the filtering. As another example, the DRx FEM 208 may be configured to amplify one or more of the filtered signals. To that end, the DRx FEM 208 may include filters, low-noise amplifiers, band select switches, matching circuits, and other components. The controller 102 can be configured to interact with components in the DRx FEM 208 to intelligently select paths for the diversity signals through the DRx FEM 208.

Similarly, the DRx FEM 208 can include a multiplexer with switchable impedance 210 to provide a desired or targeted phase shift. The targeted phase shift can be based at least in part on signals selected for processing in the DRx FEM 208. The multiplexer with switchable impedance 210 can be configured to selectively couple an inductor into the signal path to provide the targeted phase shift. The controller 102 can be configured to control the multiplexer with switchable impedance 210 to intelligently select the impedance provided in the signal path. This selection can be based on the number of frequency bands selected for processing (e.g., single-band mode or multi-band mode) and/or the particular frequency band(s) selected for processing (e.g., the selected inductance can be based at least in part on the filters associated with the selected signals).

The DRx FEM 208 transmits at least a portion of the processed diversity signals to the transceiver 104. The transceiver 104 may be controlled by the controller 102. In some embodiments, the controller 102 may be implemented within the transceiver 104.

The controller 102 can be configured to control the DRx FEM 208 to selectively direct signals to suitable signal paths and/or to select suitable impedances for selected signal paths. Thus, the DRx configuration 200 can be configured to provide a targeted phase shift with the multiplexer 210 using a switched multiplexing configuration where impedance is shared for multiple signal paths. The controller 102 can be configured to intelligently select the impedance coupled to the signal path so received signals from the diversity antenna 140 include a targeted phase shift to reduce, for example, insertion losses relative to multiplexers with permanently coupled signal paths (as opposed to switchable signal paths). The disclosed multiplexers and front end configurations are configured to provide switchable impedance for targeted phase shifting with multiplexing functionality into a front end component (e.g., a DRx module, MiMo module, etc.) and to include switchable impedances with the multiplexer to reduce loss, reduce the number of components, reduce costs, and the like relative to systems that include inductors for each diplexer path or signal path.

Examples of Products and Architectures

Figure 3:
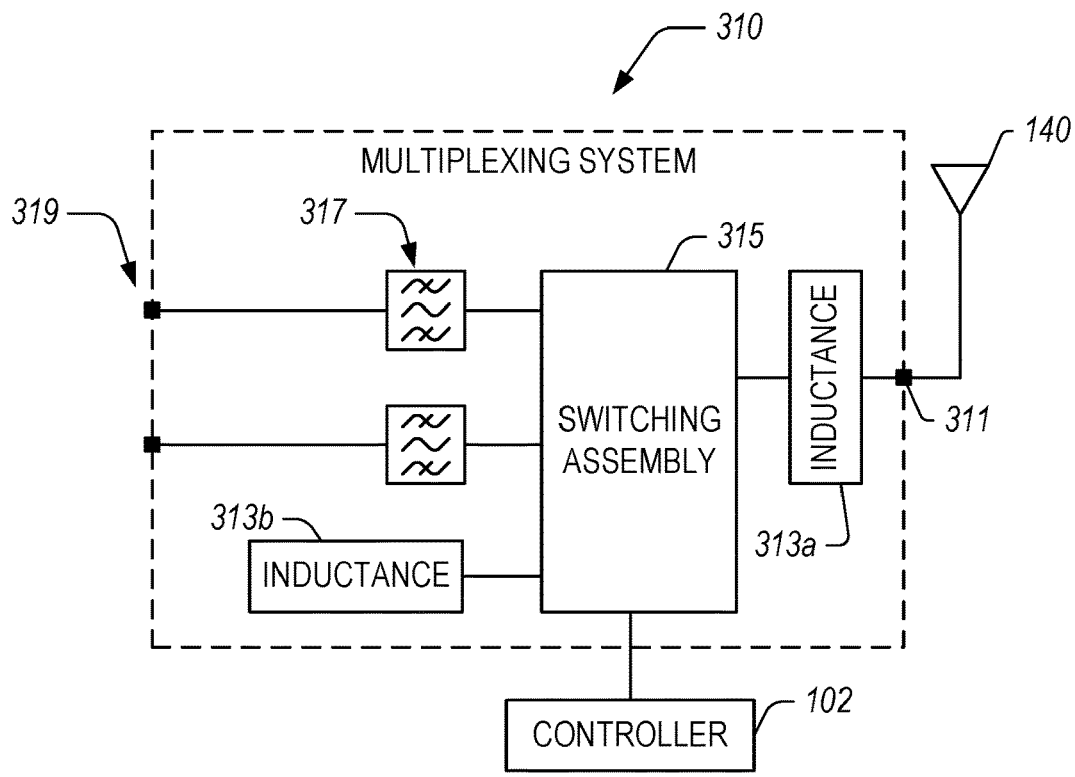
FIG. 3 illustrates a multiplexing system that includes a plurality of filters individually associated with corresponding frequency bands.

FIG. 3 illustrates a multiplexing system 310 that includes a plurality of filters 317 individually associated with corresponding frequency bands. The multiplexing system 310 includes a switching assembly 315 configured to provide one or more simultaneous signal paths between a signal port 311 and one or more respective filters. The multiplexing system 310 includes a first inductance 313a associated with the signal port 311 of the switching assembly 315. The multiplexing system 310 includes a second inductance 313b coupled to an added throw of the switch assembly 315, the added throw capable of being selectively connected to the signal port 311 to provide a desired or targeted phase for each of the one or more simultaneous signal paths.

The multiplexing system with switchable impedance 310 can be implemented in a front end configuration, such as a front end module, diversity receiver module, and/or multiple input multiple output (MiMo) module. The multiplexing system 310 may be implemented in a module with multiple paths corresponding to multiple frequency bands and/or different communication protocols. The multiplexing system 310 is coupled to a diversity antenna 140 configured to receive a diversity signal at the signal port 311. In some implementations, the diversity signal may be a single-band signal including data modulated onto a single frequency band. In some implementations, the diversity signal may be a multi-band signal (also referred to as an inter-band carrier aggregation signal) including data modulated onto multiple frequency bands and/or data modulated onto multiple frequency bands using different communication protocols.

The multiplexing system 310 has the signal port 311 that receives the diversity signal from the diversity antenna 140 and multiplexed ports 319 that provide a processed diversity signal to another component, such as a transceiver described herein. In some implementations, the diversity signal passes through a diplexer, triplexer, or other multiplexer prior to being received at the signal port 311. The signal port 311 feeds into an input of a switching assembly 315 with the first inductance 313a coupled to the signal port and the switching network 315. The switching assembly 315 includes a plurality of multiplexer outputs, individual outputs corresponding to a respective frequency band. The multiplexed ports 319 may be coupled to a second multiplexer (not shown). The inductance 313b can be selectively coupled to the signal paths to the respective filters 317 to provide a targeted phase shift.

The frequency bands may be cellular frequency bands, such as UMTS (Universal Mobile Telecommunications System) frequency bands. For example, a first frequency band may be UMTS downlink or "Rx" Band 12, between 699 megahertz (MHZ) and 716 MHz, and a second frequency band may be UMTS downlink or "Rx" Band 26, between 814 MHz and 849 MHz. Other downlink frequency bands may be used, such as those described below in Table 1 or other non-UMTS frequency bands.

The multiplexing system 310 includes a controller 102 that selectively activates one or more of the plurality of paths through the switching assembly 315. The controller 102 can intelligently activate selected paths based at least in part on a band selection signal received from another component in the front end configuration or another component in a wireless device. The controller 102 also selectively activates a programmed inductance with the inductance 313b coupled to the switching assembly 315. The controller 102 can intelligently select an inductance based at least in part on a band selection signal received from another component in the front end configuration or another component in a wireless device. The selected inductance can be configured to provide a targeted phase shift that corresponds to the selected signal(s) and associated filter(s) 317.

As noted herein, in some implementations, the diversity signal is a single-band signal. Thus, in some implementations, the switching assembly 315 is a single-pole/multiple-throw (SPMT) switch that routes the diversity signal to one of the plurality of paths corresponding to the frequency band of the single-band signal based on a signal received from the controller 102. The controller 102 may generate the signal based on a band select signal received from another component in the front end configuration or from another component of a wireless device.

As noted herein, in some implementations, the diversity signal is a multi-band signal. Thus, in some implementations, the switching assembly 315 is a signal splitter that routes the diversity signal to two or more of the plurality of paths corresponding to the two or more frequency bands of the multi-band signal based on a splitter control signal received from the controller 102. The function of the signal splitter may be implemented as a plurality of parallel SPST switches, an SPMT switch, a diplexer filter, or some combination of these. The controller 102 may generate the splitter control signal based on a band select signal received by the controller 102 from another component or controller in the system.

Thus, in some implementations, the controller 102 is configured to selectively activate one or more of the plurality of paths based on a band select signal received by the controller 102. In some implementations, the controller 102 is configured to selectively activate one or more of the plurality of paths by transmitting a splitter control signal to a signal splitter such as the switching assembly 315.

The multiplexing system 310 includes a plurality of bandpass filters 317. Each bandpass filter 317 is disposed along a corresponding one of the plurality of paths and configured to filter a signal received at the bandpass filter to the respective frequency band of the one of the plurality of paths. In some implementations, the bandpass filters 317 are further configured to filter a signal received at the bandpass filter to a downlink frequency sub-band of the respective frequency band of the one of the plurality of paths.

The multiplexing system 310 includes the switching assembly 315 configured for multi-path operability and connectability to the signal port 311. The multiplexing system 310 can be configured to provide switchable impedance using the switching assembly 315 and inductances 313a, 313b. For example, the multiplexing system 310 can be configured to select one or more radio access networks for processing by closing and/or opening selected switches or otherwise forming selected paths through the switching network 315 and directing signals to designated filters associated with a desired or targeted radio access network. The multiplexing system 310 can be configured to provide targeted phase shifts by selectively activating inductance 313b, wherein the inductance 313b can include a single inductance value, multiple selectable inductance values, and/or a range of programmable inductance values. The intelligence for selecting the enabled paths through the multiplexing system 310 and the selected inductances can be provided by the controller 102.

The filters 317 implemented between the switching assembly 315 and the multiplexed ports 319 can be associated with particular radio access networks. The filters 317 can be any suitable filter, such as the filters described in greater detail elsewhere herein. In some implementations, the filters 317 are respectively configured to filter signals corresponding to the respective radio access networks.

The controller 102 can receive an indication of desired signals (e.g., radio access networks) or an indication of expected signals (e.g., radio access networks) and enable corresponding paths between the switching assembly 315 and the filters 317. The switching assembly 315 can be implemented as a signal splitter, a diplexer, a combination of switches, or the like, as described in greater detail elsewhere herein. The controller 102 is configured to switch the paths through the switching assembly 315 so that the signals received at the signal port 311 from the diversity antenna 140 are selectively passed through either one or both of the filters 317 to select out signals from a particular radio access network or from a combination of radio access networks. Accordingly, the controller 102 intelligently controls the switching assembly 315 for reconfigurable network selection using the multiplexing system.

In some implementations, the multiplexing system 310 is a reconfigurable multiplexer controllable by the controller 102. For example, in some implementations, the controller 102 is configured to selectively and intelligently activate one or more paths within the multiplexing system 310 to route the diversity signal to corresponding one or more outputs. The multiplexing system 310, for example, can include the switching assembly 315 that can selectively provide one or more simultaneous paths through the switching assembly 315 to respective ports 319 of the multiplexing system 310. The controller 102 is configured to selectively activate one or more of the plurality of paths based at least in part on information regarding the content of the diversity signal (e.g., the frequency bands present in the diversity signal). Furthermore, the controller 102 is configured to selectively activate one or more additional paths through the inductance 313b to provide a targeted or desired phase shift based at least in part on information regarding the characteristics of the filters 317 used to filter the signals.

Figure 4:
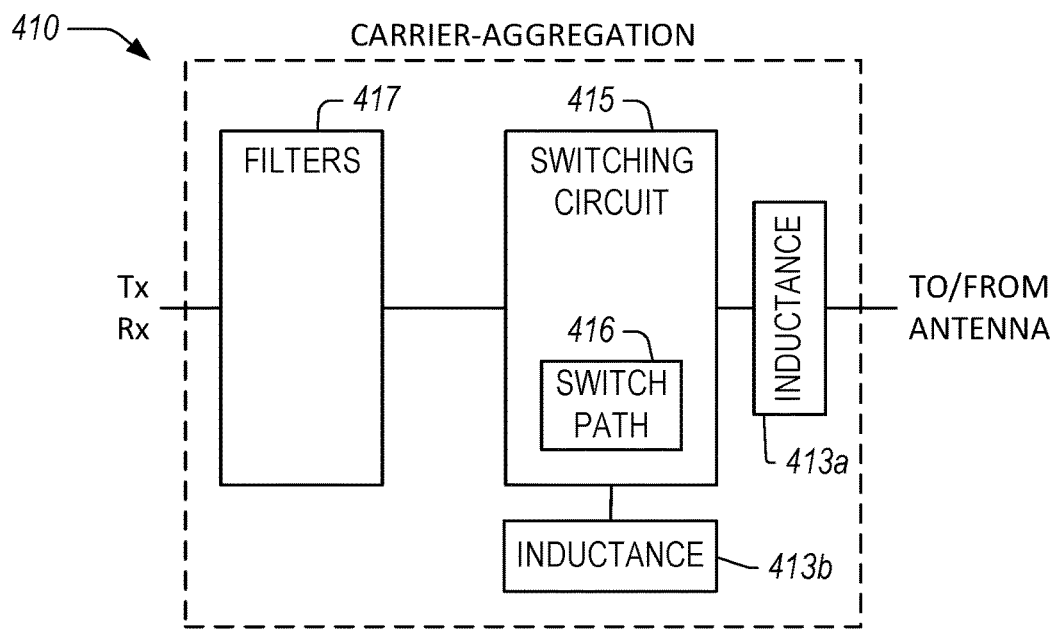
FIG. 4 illustrates an example of a carrier aggregation (CA) system that can be implemented in a front end configuration, such as a front end module, diversity receiver module, and/or multiple input multiple output (MiMo) module, examples of some of which are described herein.

FIG. 4 illustrates an example of a carrier aggregation (CA) system 410 that can be implemented in a front end configuration, such as a front end module, diversity receiver module, and/or multiple input multiple output (MiMo) module, examples of some of which are described herein. The CA system 410 is similar to the multiplexing system 310 described herein with reference to FIG. 3, except that the CA system 410 includes a filter assembly 417 and a switch path 416 through the switching assembly 415.

As illustrated, the CA system 410 is configured to provide a transmit path where signals are received (e.g., Tx signals) and passed to an antenna port for transmission, the signals passing through the filter assembly 417 and a switch path 416 in the switching circuit 415, wherein the switch path 416 selectively includes an inductance 413b. The CA system 410 is also configured to provide a receive path where signals are received from an antenna port and passed to an output port for further processing (e.g., Rx signals), the signals passing through the switching circuit 415 with the switch path 416 and the filters 417. The switching circuit 415 is coupled to the antenna port through the inductance 413a configured to provide an impedance for single band operation and to provide an impedance that is combined in parallel with the inductance 413b to provide a targeted impedance for multi-band operation. The number of signal paths and signal ports can be extended to any suitable number and are hence illustrated as a single path. The concepts described herein with respect to the CA system 410 can be extended to any desirable number of signal paths and input/output ports.

The CA system 410 can be configured to provide reconfigurable network selection using the switching circuit 415. For example, the CA system 410 can be configured to select one or more radio access networks for processing by forming selected paths through the switching network 415 using the switch path 416 and directing signals to designated filters 417 associated with a desired or targeted radio access network. The intelligence for selecting the activated switch paths 416 can be provided by a controller (not shown), similar to the controller 102 described herein with reference to FIGS. 1-3.

The filter assembly 417 provides filtering for the respective signals provided by the switching circuit 415. The filter assembly 417 includes at least one filter per signal path through the filter assembly 417. A filter for an individual signal path through the filter assembly 417 can be designed to a pass a frequency band associated with a particular radio access network. The radio access networks can correspond to cellular frequency bands, examples of which are described in Table 1 herein.

Although not illustrated, it is to be understood that the output of the CA system 410 can be passed to a multiplexer for signal combination. In some embodiments, one or more of the output ports can be passed to another module without being combined with the other signals from other output ports. It is also to be understood that the CA system 410 can include additional components that are not included in the illustrations, such as components for impedance matching, phase matching, additional filtering, amplification, switching, etc.

The disclosed CA system 410 and the associated switchable impedance features can be used in conjunction with other carrier aggregation systems. For example, the disclosed CA system 410 can be implemented in carrier aggregation modules and systems that utilize switched multiplexing, examples of which are described in greater detail in U.S. Pat. Pub. No. 2015/0133067, entitled "Systems and Methods Related to Carrier Aggregation Front-End Module Applications," published May 14, 2015, the entirety of which is incorporated herein by reference so as to form part of this specification for all purposes.

FIGS. 5A, 5B, 5C and 5D illustrate example implementations of a multiplexing systems 510a-510d with switchable impedance. The multiplexing systems 510a-510d include respective switching networks 515a-515d coupled to an antenna 140 or antenna port with an inductor L1 513a coupled to the antenna port and switching networks 515a-515d, the inductor L1 513a providing a path to a reference potential node through an inductance with a value of 2 L. In each of the multiplexing systems 510a-510d, shunt inductors can be excluded or eliminated from individual signal paths from the filters 517 to the switching network 515a-515d, instead using a switchable impedance 513b coupled to the switching networks 515a-515d. The switching networks 515a-515d are configured to provide selectable paths to a plurality of filters 517, each filter associated with a cellular frequency band. The cellular frequency bands are designated as BAND_a through BAND_h and can include any suitable combination of cellular frequency bands, such as bands selected from Table 1 below. For example, in some implementations BAND_a and BAND_b can correspond to subdivisions of B28, BAND_c can correspond to B12, BAND_d can correspond to B26, BAND_e can correspond to B29, BAND_f can correspond to B27, BAND_g can correspond to B20, and/or BAND_h can correspond to B8. Other band combinations are possible as well, the above is merely used for illustrative purposes.

The switching networks 515a-515d are illustrated as a plurality of single pole, single throw switches that can be independently operated. The controller 502 is configured to selectively operate the switches in the switching networks 515a-515d to intelligently select desired or targeted paths through the switching networks 515a-515d for further filtering with an associated filter 517 and to selectively couple one or more inductors 513b into the signal path. In some embodiments, different cellular frequency bands can be configured to have signal paths with inductance values coupled thereto that depend at least in part on the cellular frequency band. In some embodiments, a front end configuration includes a plurality of multiplexing systems such as the multiplexing systems 510a-510d wherein each multiplexing system includes inductances 513a, 513b tailored for the particular cellular frequency range (e.g., LB cellular, MB cellular, HB cellular, UHB cellular, etc.) to be processed by the multiplexing systems so that the tailored inductances provide a targeted phase shift for each multiplexing system and each selected signal path through the respective multiplexing system.

As illustrated, it is to be understood that the number of filters and associated signal paths can be expanded to cover any suitable number of cellular networks. For example, the multiplexing system can include N+1 switchable paths where each of N paths passes through a particular filter associated with a cellular frequency band, and the remaining path is coupled to a switchable impedance element, such as an inductor. By extension and as described herein, the multiplexing system can include N+x switchable paths where each of N paths passes through a particular filter associated with a cellular frequency band, and the remaining x paths are coupled to switchable impedance elements.

Figure 5A:
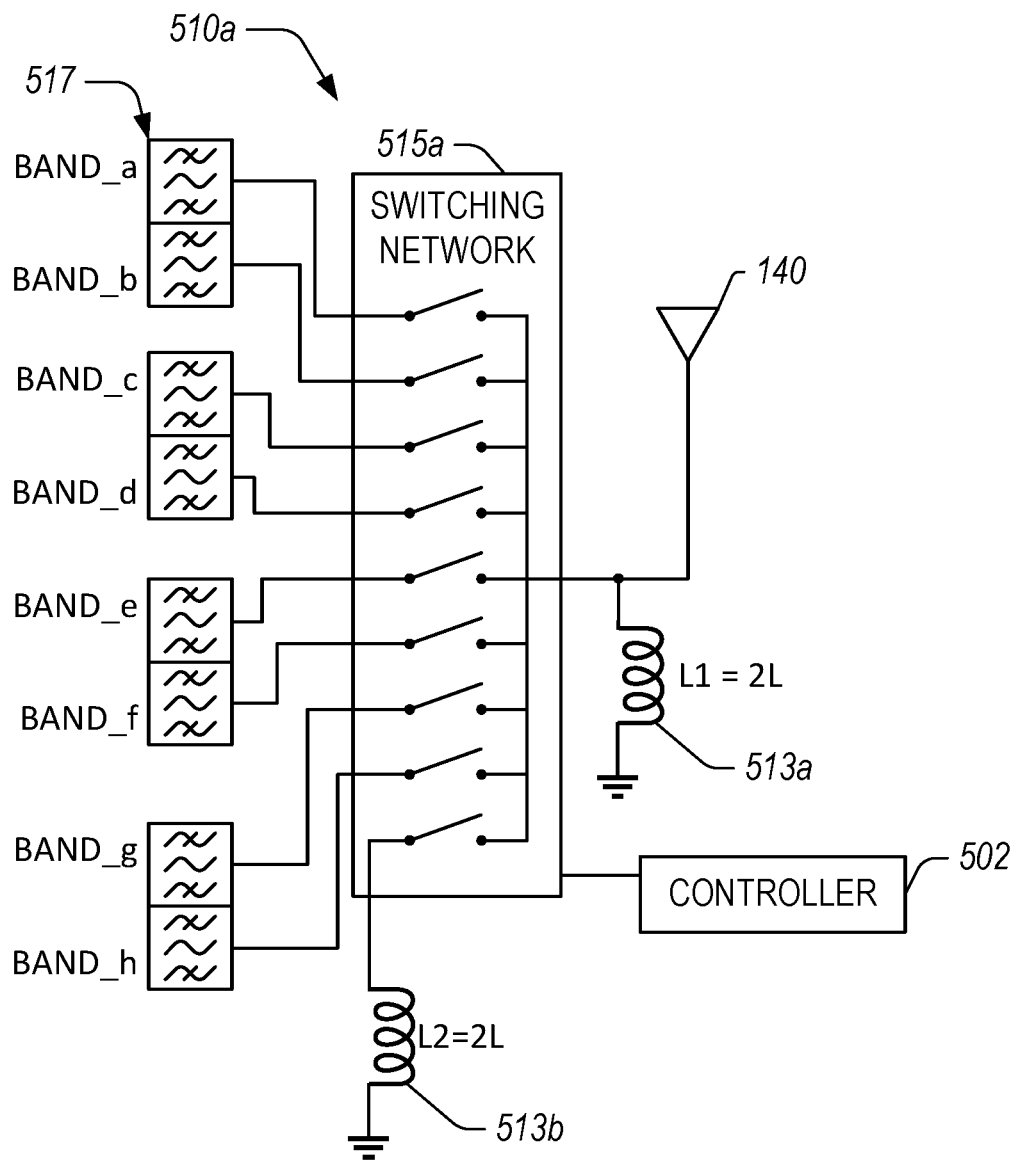
FIGS. 5A, 5B, 5C, and 5D illustrate example implementations of a multiplexing systems with switchable impedance.

FIG. 5A illustrates an example multiplexing system 510a with a switching network 515a that is configured to selectively couple the inductor L2 513b to the signal paths provided to the filters 517. The inductor L2 513b can have an inductance value of 2 L that is substantially the same as the inductance value of the inductor L1 513a. In a single band mode, the multiplexing system 510a is configured to provide a path from the antenna 140 to a particular filter 517. In a multi-band mode, the multiplexing system 510a is configured to provide a plurality of paths from the antenna 140 to selected filters 517 and to couple the inductor L2 513b to the signal path so that the inductors 513a, 513b are connected in parallel. This can be used to provide a targeted phase shift in both the single band mode and the multi-band mode. This configuration is in contrast to multiplexing systems that include shunt inductors on each filter path and/or multiplexing systems that include shunt inductors on each diplexer path. This reduces the number of components used in such multiplexing systems. This can also reduce insertion losses in some instances in single band mode, as described in greater detail with respect to FIGS. 6A and 7A.

Figure 5B:
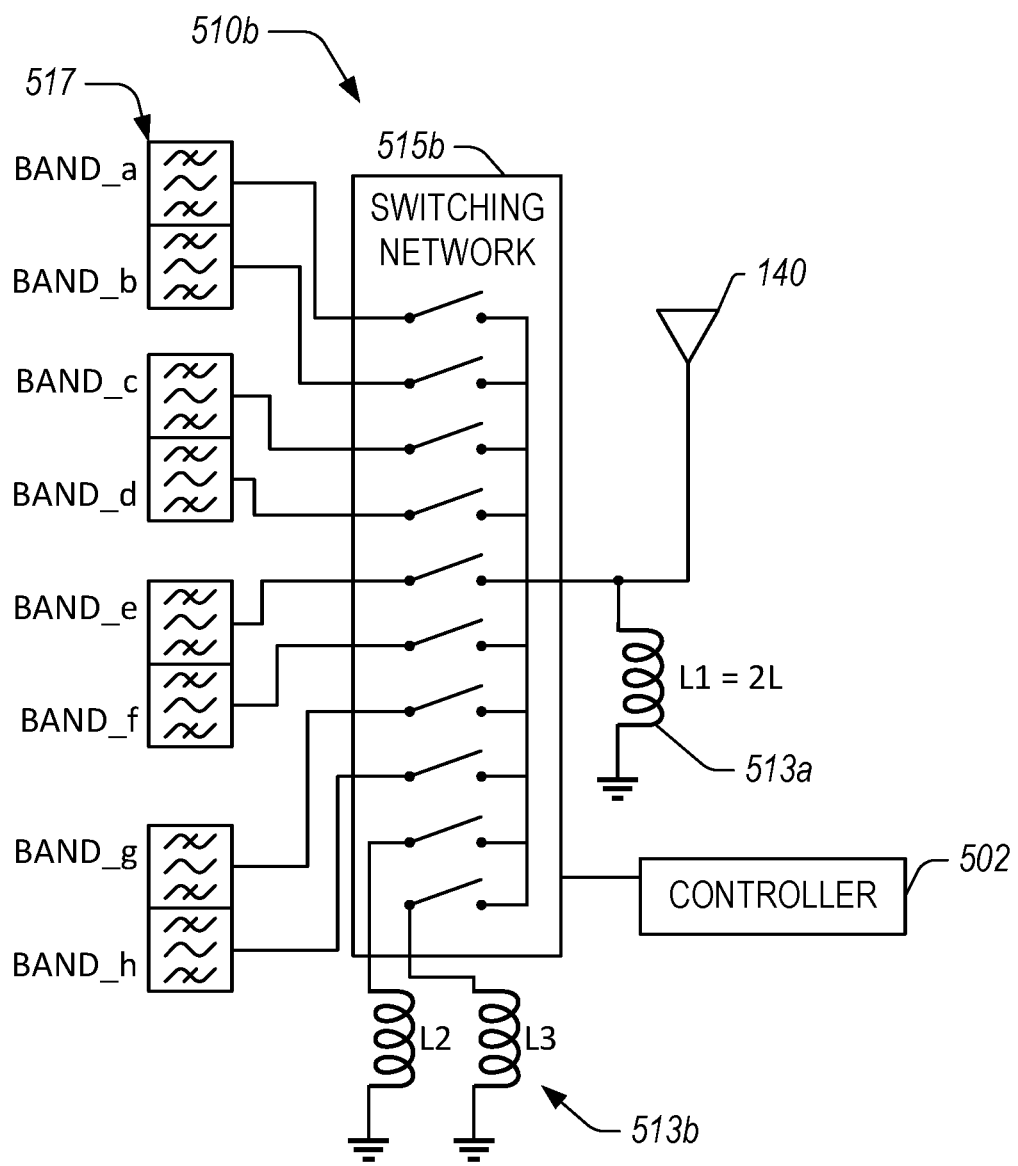

FIG. 5B illustrates an example multiplexing system 510b with a switching network 515b that is configured to selectively couple inductors L2, L3 513b to the signal paths provided to the filters 517. The inductors L2, L3 513b can have tailored inductances that are configured to provide targeted phase shifts based at least in part on the characteristics of the filters 517. The inductors L2, L3 513b can be selected in any combination depending at least in part on an operation mode and selected signal paths. For example, in a single band mode, the multiplexing system 510b is configured to provide a path from the antenna 140 to a particular filter 517. In a multi-band mode, the multiplexing system 510b is configured to provide a plurality of paths from the antenna 140 to selected filters 517 and to selectively couple inductor L2, inductor L3, or both inductor L2 and inductor L3 to the signal path so that the inductor 513a and selected inductors 513b are connected in parallel. This can be used to provide a targeted phase shift in both the single band mode and the multi-band mode. This can also be used to provide a targeted phase shift that is tailored based on the characteristics of the filters selected for multi-band operation.

Figure 5C:
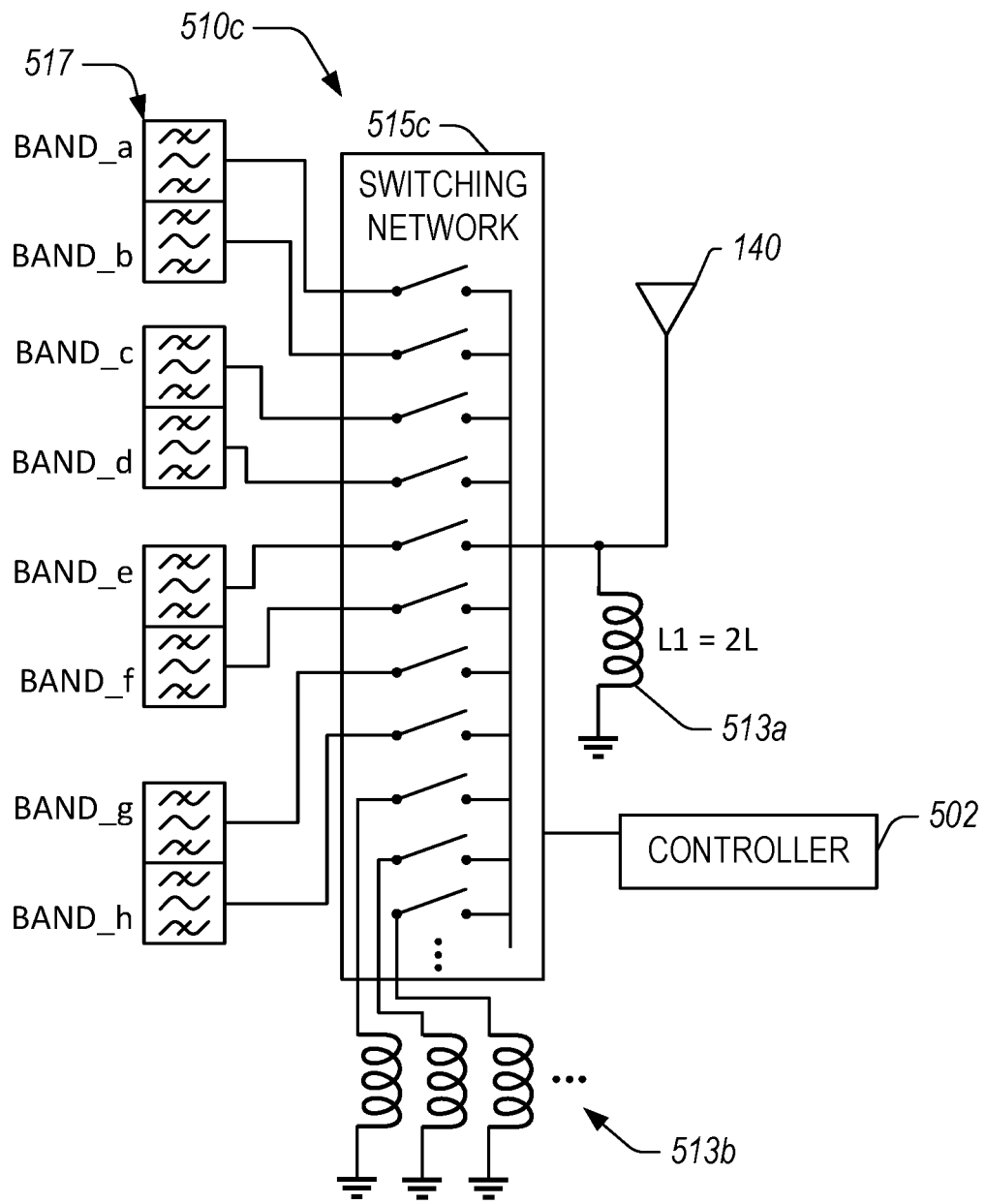

FIG. 5C illustrates an example multiplexing system 510c with a switching network 515c that is configured to selectively couple a plurality of inductors 513b to the signal paths provided to the filters 517. The plurality of inductors L2, L3 513b can have tailored inductances that are configured to provide targeted phase shifts based at least in part on the characteristics of the filters 517. The plurality of inductors 513b can be selected in any suitable combination depending at least in part on an operation mode and selected signal paths. For example, in a single band mode, the multiplexing system 510c is configured to provide a path from the antenna 140 to a particular filter 517. In a multi-band mode, the multiplexing system 510c is configured to provide a plurality of paths from the antenna 140 to selected filters 517 and to selectively couple any individual inductor 513b or combination of inductors 513b to the signal path so that the inductor 513a and selected inductors 513b are connected in parallel. This can be used to provide a targeted phase shift in both the single band mode and the multi-band mode. This can also be used to provide a targeted phase shift that is tailored based on the characteristics of the filters selected for multi-band operation.

Figure 5D:
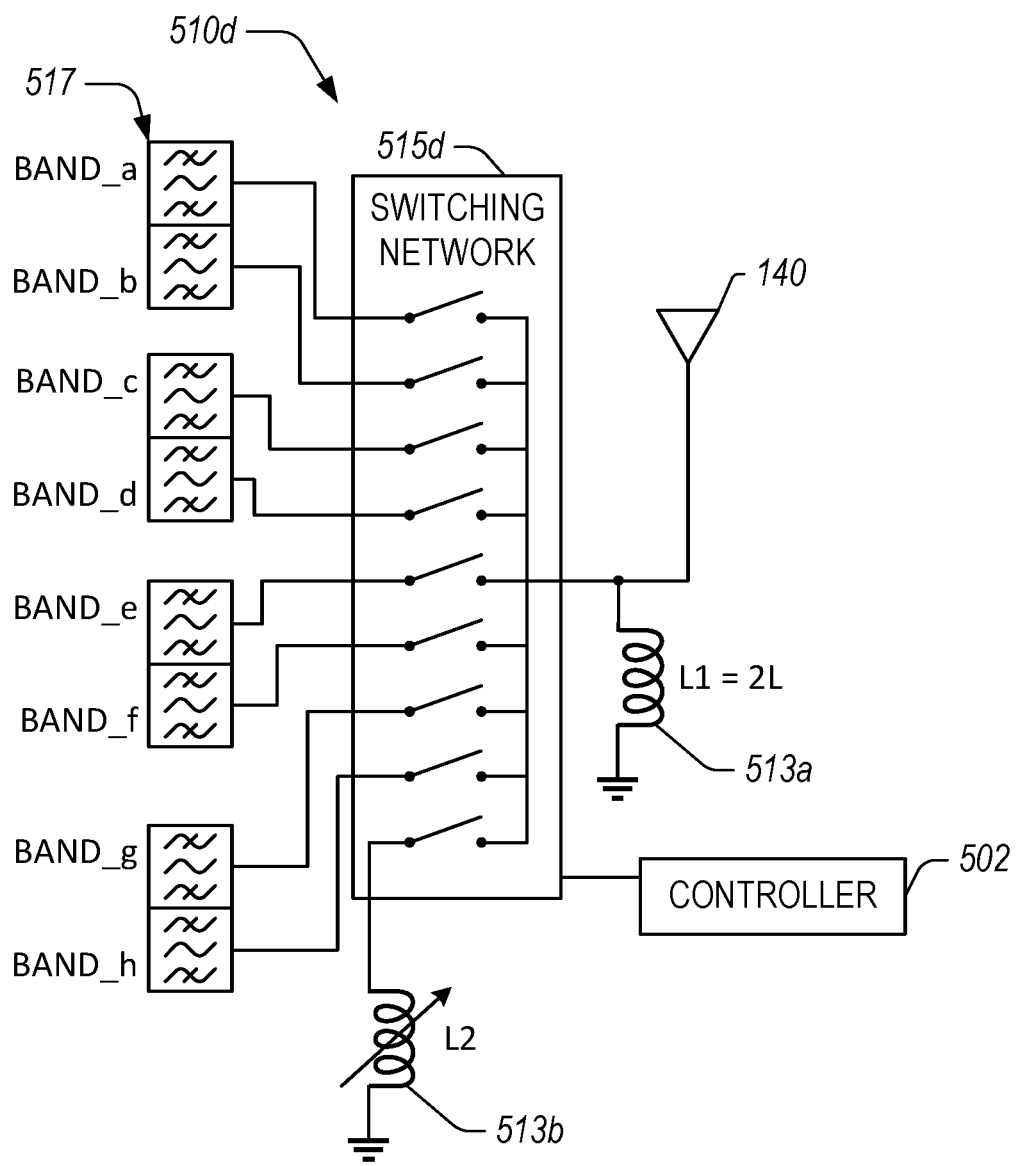

FIG. 5D illustrates an example multiplexing system 510d with a switching network 515d that is configured to selectively couple a variable inductor L2 513b to the signal paths provided to the filters 517. The variable inductor L2 513b can be configured to be programmed to provide tailored inductances that are configured to provide targeted phase shifts based at least in part on the characteristics of the filters 517. The variable inductor L2 513b can be programmed to assume any suitable inductance depending at least in part on selected signal paths. For example, in a multi-band mode, the multiplexing system 510d is configured to provide a plurality of paths from the antenna 140 to selected filters 517 and to couple the variable inductor L2 513b to the signal path so that the inductor 513a and variable inductor L2 513b are connected in parallel. In this multi-band mode, the variable inductor L2 513b can be programmed to provide an inductance that depends on the particular bands selected. This can be used to provide a targeted phase shift in both the single band mode (e.g., without the variable inductor L2 513b) and the multi-band mode (e.g., with the variable inductor L2 513b assuming a tailored inductance value). This can also be used to provide a targeted phase shift that is tailored based on the characteristics of the filters selected for multi-band operation.

Figure 6A:
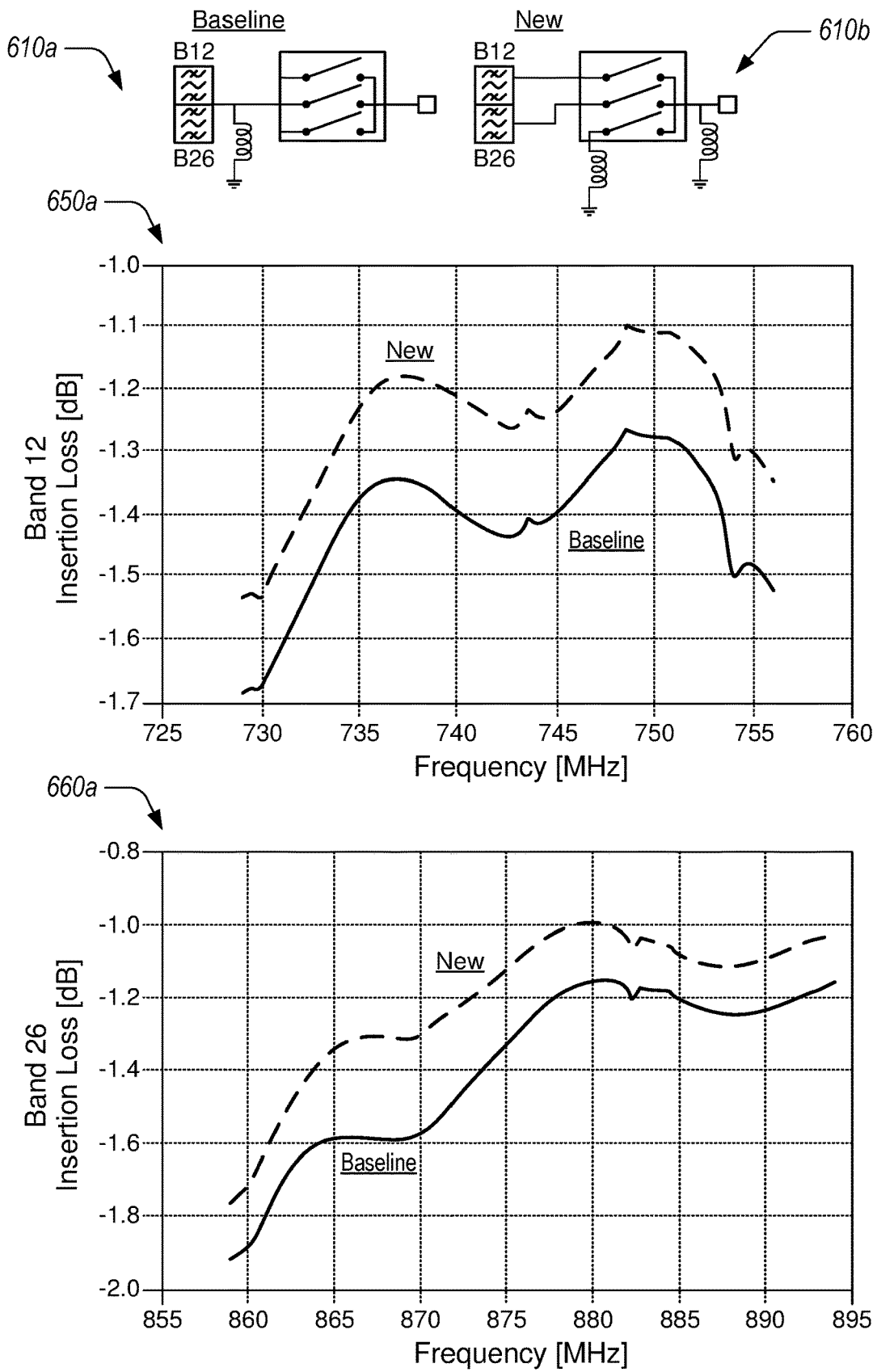
FIGS. 6A and 6B illustrate comparisons of different multiplexer architectures operating respectively in a single-band mode and in a multi-band mode or carrier aggregation mode.

FIG. 6A illustrates a comparison of different multiplexer architectures 610a, 610b operating in a single-band mode. The plots 650a, 660a provide simulated data corresponding to the different architectures for two cellular frequency bands, B12 and B26, to illustrate improvements in insertion losses associated with providing switchable impedance for targeted phase shifts in a switched multiplexing application.

A first example architecture 610a, labeled "baseline" in the diagram above and in the plots below, includes a signal port coupled to a switching network with a single signal path from the switching network to a duplexer that includes filters for band B12 and band B26. The baseline architecture 610a includes a shunt inductor coupled to the single signal path between the switching network and the duplexer. Such an architecture may experience relatively large insertion losses in single-band operating modes. The baseline architecture 610a may also not be able to support particular carrier aggregation modes if filters in different duplexer setups have overlapping frequency bands. In such a scenario, duplicate filters may be required to provide all desired or targeted carrier aggregation schemes.

The second example architecture 610b, labeled "new" in the diagram above and in the plots below, includes a signal port coupled to a switching network with three single pole single throw switches in parallel. Two of those throws are coupled to filters for band B12 and band B26, respectively. The third throw is coupled to an inductor that can be selectively coupled to the signal port. The new architecture 610b also includes an inductor shunt coupled to the signal port.

The plots 650a, 650b respectively correspond to insertion losses as a function of frequency for the two example cellular frequency bands: B12 and B26. In each plot, the baseline architecture 610a is illustrated with a solid line and the new architecture 610b is illustrated with the dashed line. In single-band operation mode, the new architecture 610b demonstrates lower insertion losses relative to the baseline architecture 610a. This may also be referred to as a non-carrier aggregation (or non-CA) mode of operation. As shown in the plots, by incorporating a switchable inductance in parallel with a shared inductor shunt, insertion losses can be reduced relative to the baseline architecture 610a that includes a shared signal path with a single shared inductor shunt. Accordingly, the new architecture 610b can improve performance in wireless devices configured for carrier aggregation when operating in non-CA modes or single-band modes, which may be the majority of the time.

Figure 6B:
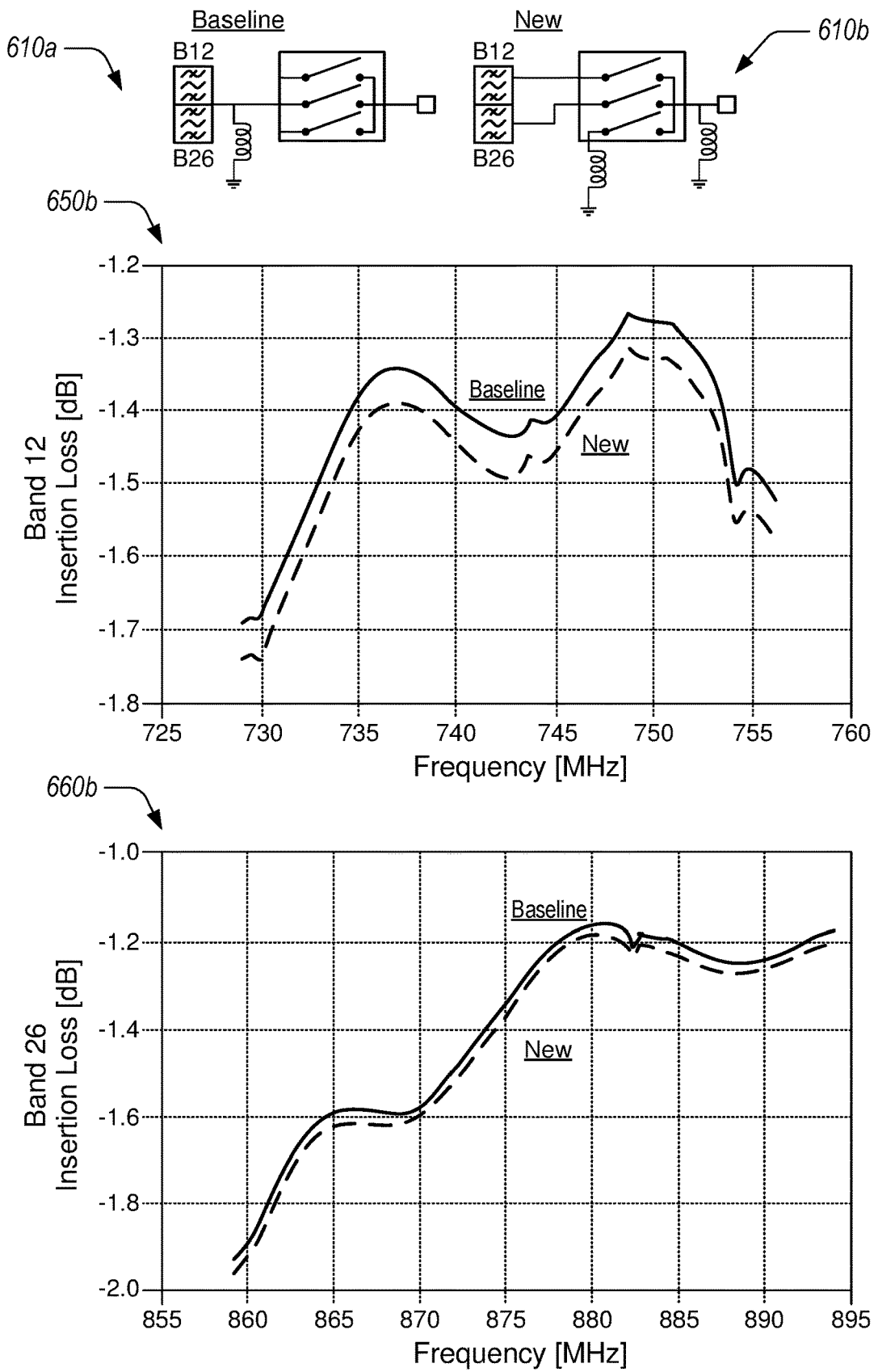

FIG. 6B illustrates performance plots 650b, 660b when the baseline architecture 610a and new architecture 610b operate in multi-band mode or carrier aggregation mode. In multi-band operation mode, the new architecture 610b demonstrates comparable insertion losses relative to the baseline architecture 610a. As shown in the plots, by incorporating a switchable inductance in parallel with a shared inductor shunt, insertion losses can be comparable relative to the baseline architecture 610a that includes a shared signal path with a single shared inductor shunt. Accordingly, the new architecture 610b can improve performance in wireless devices configured for carrier aggregation when operating in non-CA modes or single-band modes, which may be the majority of the time, and may provide similar performance when operating in CA modes or multi-band modes. One advantage of the new architecture 610b relative to the baseline architecture 610a when expanding the design to cover many different frequency bands is the reduction in components, particularly inductors. The new architecture 610b provides improved performance in single-band operating modes and comparable performance in CA-mode while reducing the number of components used in the device. The reduction in components can result in cost savings. The reduction in components may also allow opportunities to improve performance by increasing the size and/or quality of the inductors and/or improving other components of the architecture or device to improve performance. Accordingly, the new architecture 610b provides increased performance, reduction in cost, and/or reduced size.

Figure 7A:
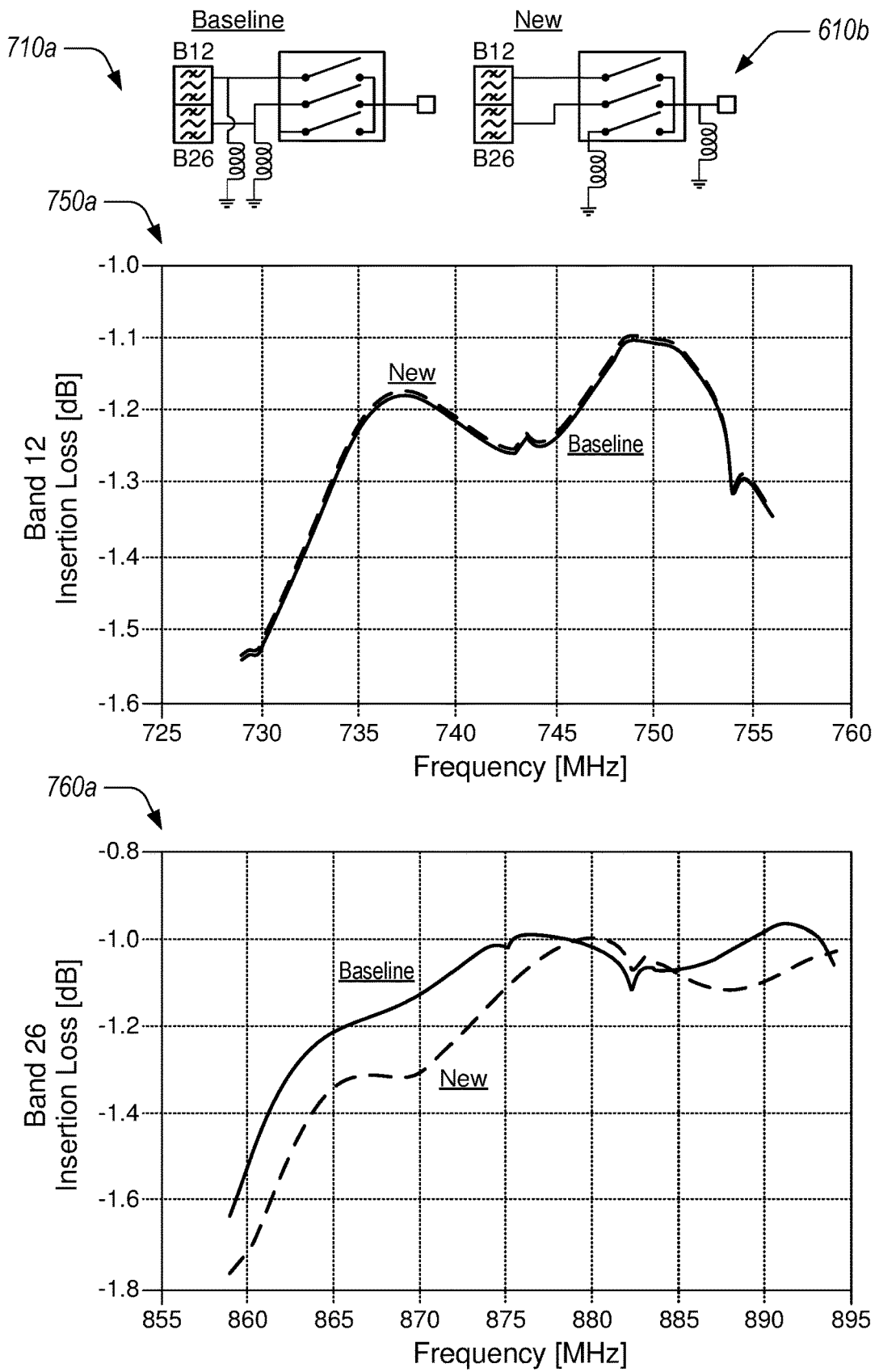
FIGS. 7A and 7B illustrate comparisons of different multiplexer architectures operating respectively in a single-band mode and in a multi-band mode or carrier aggregation mode.

FIG. 7A illustrates a comparison of different multiplexer architectures 710a, 610b operating in a single-band mode. The plots 750a, 760a provide simulated data corresponding to the different architectures for two cellular frequency bands, B12 and B26, to illustrate resulting insertion losses associated with providing switchable impedance for targeted phase shifts in a switched multiplexing application.

A third example architecture 710a, labeled "baseline" in the diagram above and in the plots below, differs from the first example architecture 610a described herein with reference to FIG. 6A in that the baseline architecture 710a includes dedicated signal paths between respective filters and the switching network with inductor shunts on each dedicated signal path. Such an architecture would result in the use of a relatively large number of shunt inductors as the number of supported cellular frequency bands grows. One difference between the baseline architecture 710a and the new architecture 610b is the sharing of the matching inductor coupled to the signal port which is used in single-band operation and the sharing of a switchable inductor coupled to a throw of the switching network that is used in multi-band operation. By comparison, the new architecture 610b, described herein with reference to FIG. 6A, can expand the number of supported cellular frequency bands without necessarily increasing the number of inductors. This reduction in components can result in cost and space savings, both of which may be used or leveraged to improve performance in a wireless device.

The plots 750a, 750b respectively correspond to insertion losses as a function of frequency for the two example cellular frequency bands: B12 and B26. In each plot, the baseline architecture 710a is illustrated with a solid line and the new architecture 610b is illustrated with the dashed line. In single-band operation mode, the new architecture 610b demonstrates comparable insertion losses relative to the baseline architecture 610a. Accordingly, the new architecture 610b can provide comparable performance in non-CA operating modes while reducing the number of components used in the architecture relative to the baseline architecture 710a.

Figure 7B:
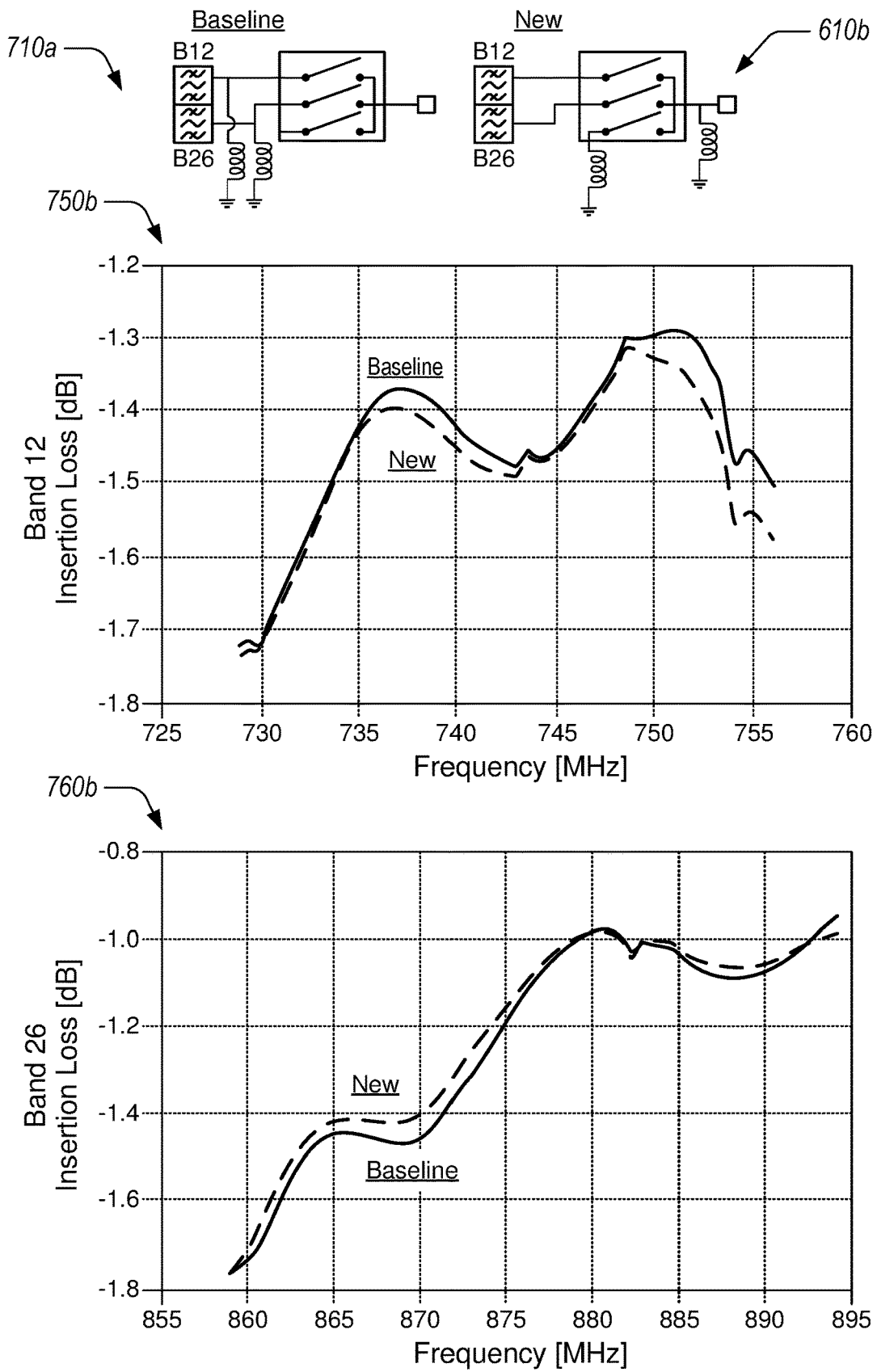

FIG. 7B illustrates performance plots 750b, 760b when the baseline architecture 710a and new architecture 610b operate in multi-band mode or carrier aggregation mode. In multi-band operation mode, the new architecture 610b demonstrates comparable insertion losses relative to the baseline architecture 710a. As shown in the plots, by incorporating a switchable inductance in parallel with a shared inductor shunt, insertion losses can be comparable relative to the baseline architecture 710a that includes a dedicated signal paths each with a shared inductor shunt. Accordingly, the new architecture 610b provides comparable performance in single- and multi-band operating modes while reducing the number of components used in the device. The reduction in components can result in cost savings. The reduction in components may also allow opportunities to improve performance by increasing the size and/or quality of the inductors and/or improving other components of the architecture or device to improve performance.

Examples of Modules, Architectures, and Devices

Figure 8:
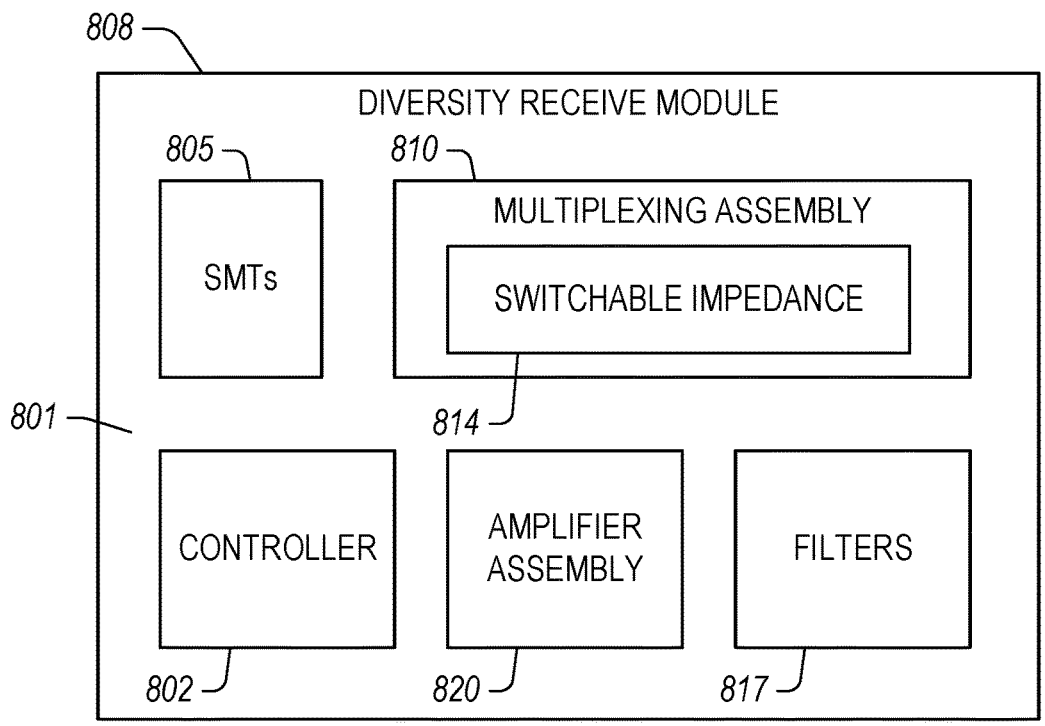
FIG. 8 shows that in some embodiments, some or all of the diversity receiver configurations and/or carrier aggregation configurations, can be implemented, wholly or partially, in a module.

FIG. 8 shows that in some embodiments, some or all of the diversity receiver configurations and/or carrier aggregation configurations, including some or all of the configurations having combinations of features described herein (e.g., with reference to FIGS. 1-7B), can be implemented, wholly or partially, in a module. Such a module can be, for example, a front-end module (FEM). Such a module can be, for example, a diversity receiver (DRx) FEM. Such a module can be, for example, a multi-input, multi-output (MiMo) module.

In the example of FIG. 8, a DRx module 808 can include a packaging substrate 801, and a number of components can be mounted on such a packaging substrate 801. For example, a controller 802 (which may include a front-end power management integrated circuit [FE-PIMC]), an amplifier assembly 820 (e.g., power amplifiers, low noise amplifiers, etc.), a multiplexing assembly 810 that includes switchable impedance circuit 814, and a filter bank 817 can be mounted and/or implemented on and/or within the packaging substrate 801. In some embodiments, the filter bank 817 is implemented as part of the multiplexing assembly 810. Other components, such as a number of SMT devices 805, can also be mounted on the packaging substrate 801. In some embodiments, the SMT devices 805 include a plurality of inductors coupled to the switchable impedance circuit 814. Although all of the various components are depicted as being laid out on the packaging substrate 801, it will be understood that some component(s) can be implemented over other component(s).

Figure 9:
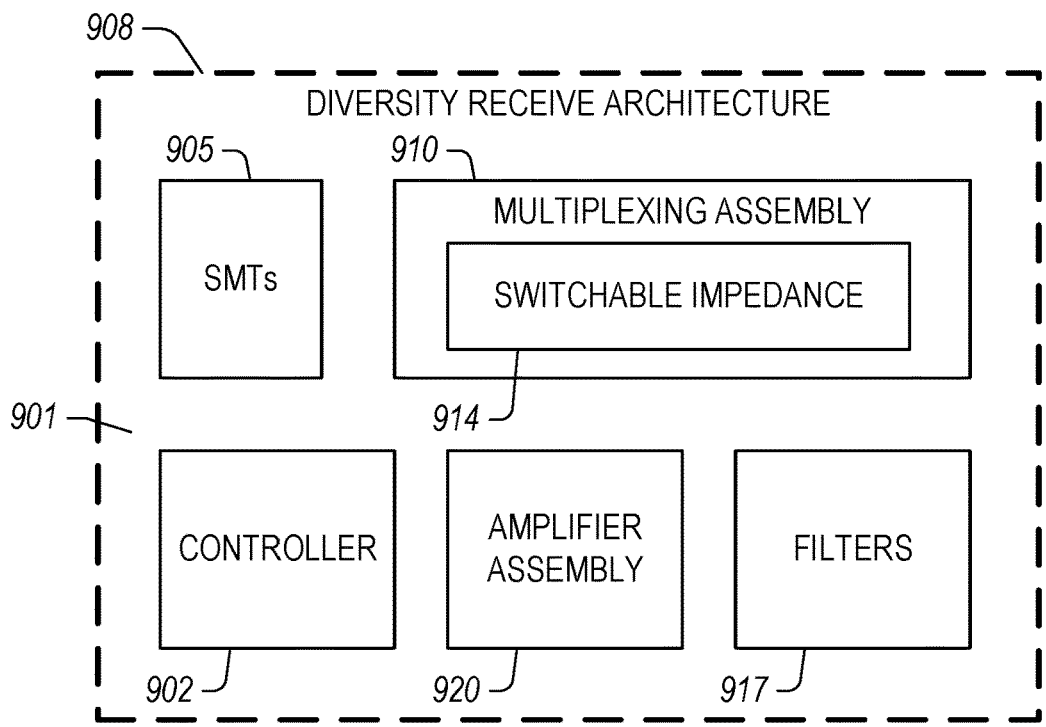
FIG. 9 shows that in some embodiments, some or all of the diversity receiver configurations and/or carrier aggregation configurations, can be implemented, wholly or partially, in an architecture.

FIG. 9 shows that in some embodiments, some or all of the diversity receiver configurations and/or carrier aggregation configurations, including some or all of the configurations having combinations of features described herein (e.g., with reference to FIGS. 1-7B), can be implemented, wholly or partially, in an architecture. Such an architecture may include one or more modules, and can be configured to provide front-end functionality such as diversity receiver (DRx) front-end functionality.

In the example of FIG. 9, an architecture 908 can include a controller 902 (which may include a front-end power management integrated circuit [FE-PIMC]), an amplifier assembly 920 (e.g., power amplifiers, low noise amplifiers, etc.), a multiplexing assembly 910 having a switchable impedance circuit 914, and a filter bank 917. In some embodiments, the filter bank 917 is implemented as part of the multiplexing assembly 910. Other components, such as a number of SMT devices 905, can also be implemented in the architecture 908. In some embodiments, the SMT devices 905 include a plurality of inductors coupled to the switchable impedance circuit 914.

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 10:
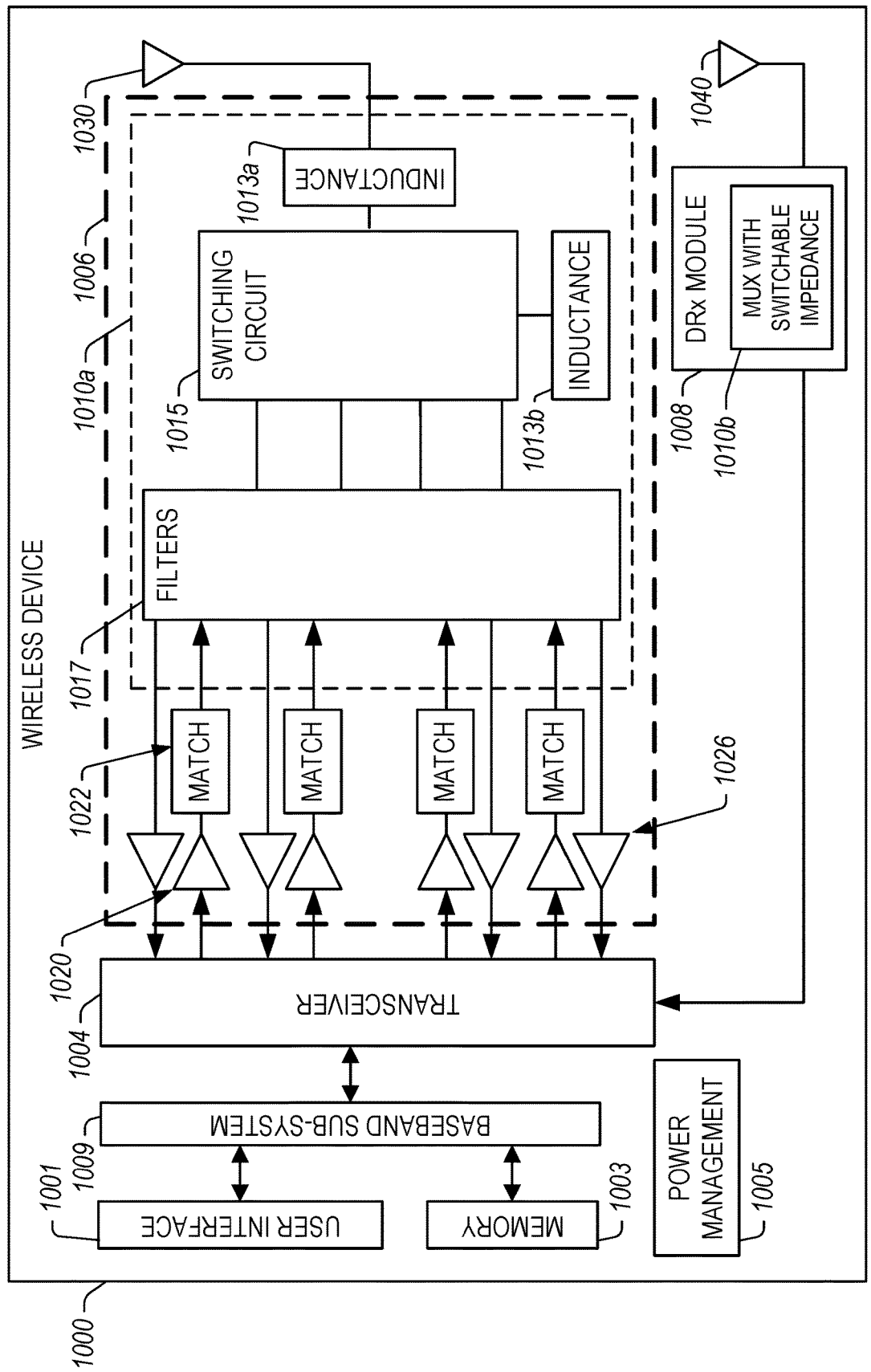
FIG. 10 depicts an example wireless device having one or more advantageous features described herein.

FIG. 10 depicts an example wireless device 1000 having one or more advantageous features described herein. In the context of one or more modules having one or more features as described herein, such modules can be generally depicted by a dashed box 1006 (which can be implemented as, for example, a front-end module), a diversity receiver (DRx) module 1008 (which can be implemented as, for example, a front-end module), and a multiplexing module 1010a, 1010b.

Power amplifiers (PAs) 1020 can receive their respective signals (e.g., radio-frequency (RF) signals) from a transceiver 1004 that can be configured and operated to generate signals to be amplified and transmitted, and to process received signals. The transceiver 1004 is shown to interact with a baseband sub-system 1009 that is configured to provide conversion between data and/or voice signals suitable for a user and RF signals suitable for the transceiver 1004. The transceiver 1004 can also be in communication with a power management component 1005 that is configured to manage power for the operation of the wireless device 1000. Such power management can also control operations of the baseband sub-system 1009 and the modules 1006, 1008, 1010a, and 1010b.

The baseband sub-system 1009 is shown to be connected to a user interface 1001 to facilitate various input and output of voice and/or data provided to and received from the user. The baseband sub-system 1009 can also be connected to a memory 1003 that is configured to store data and/or instructions to facilitate the operation of the wireless device, and/or to provide storage of information for the user.

In the example wireless device 1000, outputs of the PAs 1020 are shown to be matched (via respective match circuits 1022) and routed to a filter bank 1017 that includes respective diplexers. Such amplified and filtered signals can be routed to a primary antenna 1030 through a switching network 1015 for transmission. In some embodiments, the filters 1017 can allow transmit and receive operations to be performed simultaneously using a common antenna (e.g., primary antenna 1030). Received signals can be routed to receive paths that can include, for example, respective low-noise amplifiers (LNAs) 1026.

In the example wireless device 1000, signals received at the primary antenna 1030 can be sent to a multiplexer 1010a with switchable impedance in the front end module 1006. The multiplexer with switchable impedance 1610a can include duplexers inductances 1013a, 1013b that can be configured to provide a targeted phase shift for signals passing through the filters 1017. The inductance 1013a can be configured to part of the path through the multiplexer 1610a when operating in single band and multi-band mode. The inductance 1013b can be configured to be selectively switched into the signal path during multi-band operation. The inductance 1013b can be configured to provide a selected or targeted inductance that may vary based at least in part on the signals being selected for processing and/or carrier aggregation. In some implementations, the multiplexer with switchable impedance 101a can be similar to the multiplexers described herein with reference to FIGS. 2-5D.

The wireless device also includes a diversity antenna 1040 and a diversity receiver module 1008 that receives signals from the diversity antenna 1040. The diversity receive module 1008 includes a multiplexer with switchable impedance 1010b, similar to the reconfigurable multiplexer 1010a in the front end module 1006. The diversity receiver module 1008 and the multiplexer with switchable impedance 1010b process the received signals and transmit the processed cellular signals to the transceiver 1004. In some embodiments, a diplexer or triplexer can be included between the diversity antenna 1040 and the DRx module 1008 and/or between the primary antenna 1030 and the front end module 1006, as described herein.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1. It is to be understood that the term radio frequency (RF) and radio frequency signals refers to signals that include at least the frequencies listed in Table 1.

TABLE 1

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |

TABLE 1-continued

| Band | Mode | Tx Frequency Range (MHz) | Rx Frequency Range (MHz) |
|---|---|---|---|
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A multiplexing system, comprising:
a plurality of filters each associated with a frequency band;
a switching assembly configured to provide one or more simultaneous signal paths between a signal port and one or more respective filters of the plurality of filters, the switching assembly including a plurality of single-pole single-throw switches with individual single-pole single-throw switches coupled to individual filters of the plurality of filters;

a first inductance coupled between the signal port and the plurality of single-pole single-throw switches of the switching assembly; and a second inductance coupled to an additional single-pole single-throw switch of the plurality of single-pole single-throw switches of the switching assembly, the additional single-pole single-throw switch configured to be selectively connected to the signal port to provide a targeted phase for each of the one or more simultaneous signal paths.

2. The system of claim 1 further comprising a controller circuit configured to control the switching assembly to provide selected signal paths between the signal port and one or more respective filters.

3. The system of claim 2 wherein the controller circuit is further configured to control the switching assembly to selectively couple the second inductance to the signal port.

4. The system of claim 1 wherein, in a single-band mode, the additional single-pole single-throw switch is open so that the second inductance is not connected to the signal port.

5. The system of claim 4 wherein, in a multi-band mode, the additional single-pole single-throw switch is closed so that the second inductance is connected to the signal port.

6. The system of claim 1 wherein the second inductance is a variable inductance.

7. The system of claim 6 wherein the second inductance is configured to provide different inductance values based at least in part on the one or more simultaneous signal paths.

8. The system of claim 1 further comprising a plurality of additional inductances coupled to a plurality of additional single-pole single-throw switches of the switching assembly, the plurality of additional single-pole single-throw switches configured to be selectively connected to the signal port to provide a targeted phase for each of the one or more simultaneous signal paths.

9. The system of claim 1 wherein individual paths between individual filters of the plurality of filters and the switching assembly do not include inductors.

10. The system of claim 1 wherein individual paths between individual diplexers of the plurality of filters and the switching assembly do not include inductors.

11. A front end architecture comprising:

a multiplexer including a plurality of filters each associated with a frequency band, a switching assembly configured to provide one or more simultaneous signal paths between a signal port and one or more respective filters of the plurality of filters, the switching assembly including a plurality of single-pole single-throw switches with individual single-pole single-throw switches coupled to individual filters of the plurality of filters, a first inductance coupled between the signal port and the plurality of single-pole single-throw switches of the switching assembly, and a second inductance coupled to an additional single-pole single-throw switch of the plurality of single-pole single-throw switches of the switching assembly, the additional single-pole single-throw switch configured to be selectively connected to the signal port to provide a targeted phase for each of the one or more simultaneous signal paths; and a controller implemented to control the switching assembly to provide respective signal paths between the signal port and any permutation of one or more of the plurality of filters and to selectively couple the second inductance to the signal port.

12. The architecture of claim 11 wherein the second inductance is a variable inductor that is controlled by the controller to provide a tailored inductance value.

13. The architecture of claim 11 further comprising one or more additional inductances coupled to additional single-pole single-throw switches of the switching assembly.

14. The architecture of claim 13 wherein the controller is further configured to selectively couple the signal port to the second inductance, to an individual inductance of the one or more additional inductances, to a combination of the one or more additional inductances, or to any combination of the second inductance and an additional inductance.

15. The architecture of claim 11 wherein the first inductance or the second inductance is implemented as a surface mount technology device.

16. The architecture of claim 11 further comprising a plurality of additional inductances coupled to a corresponding plurality of additional single-pole single-throw switches of the switching assembly, each of the plurality of additional single-pole single-throw switches configured to be selectively connected to the signal port to provide a targeted phase for each of the one or more simultaneous signal paths.

17. The architecture of claim 11 wherein the second inductance is configured to provide different inductance values based at least in part on the one or more simultaneous signal paths.

18. A wireless device comprising:

an antenna port coupled to an antenna;

a multiplexer coupled to the antenna port, the multiplexer including a plurality of filters each associated with a frequency band, a switching assembly configured to provide one or more simultaneous signal paths between a signal port and one or more respective filters of the plurality of filters, the switching assembly including a plurality of single-pole single-throw switches with individual single-pole single-throw switches coupled to individual filters of the plurality of filters, a first inductance coupled between the signal port and the plurality of single-pole single-throw switches of the switching assembly, and a second inductance coupled to an additional single-pole single-throw switch of the plurality of single-pole single-throw switches of the switching assembly, the added additional single-pole single-throw switch configured to be selectively connected to the signal port to provide a targeted phase for each of the one or more simultaneous signal paths; and a controller implemented to control the switching assembly to provide respective signal paths between the signal port and any permutation of one or more of the plurality of filters and to selectively couple the second inductance to the signal port through the additional single-pole single-throw switch.

19. The device of claim 18 further comprising additional inductances coupled to additional single-pole single-throw switches of the switching assembly.

20. The device of claim 18 further comprising a plurality of additional inductances coupled to a corresponding plurality of additional single-pole single-throw switches of the switching assembly, the plurality of additional single-pole single-throw switches configured to be selectively connected to the signal port to provide a targeted phase for each of the one or more simultaneous signal paths.

* * * * *